(12) United States Patent
Turi

(10) Patent No.: US 8,733,231 B2
(45) Date of Patent: May 27, 2014

(54) DISPENSING HEAD FOR A MACHINE FOR MAKING BEVERAGES WITH SINGLE-DOSE CAPSULES, AND MACHINE COMPRISING SAID DISPENSING HEAD

(75) Inventor: Mariano Turi, Zürich (CH)

(73) Assignee: Koninklijke Philips N.V., Eindhoven (NL)

( * ) Notice: Subject to any disclaimer, the term of this patent is extended or adjusted under 35 U.S.C. 154(b) by 951 days.

(21) Appl. No.: 12/518,712

(22) PCT Filed: Dec. 7, 2007

(86) PCT No.: PCT/EP2007/010658
§ 371 (c)(1),
(2), (4) Date: Jun. 11, 2009

(87) PCT Pub. No.: WO2008/071352
PCT Pub. Date: Jun. 19, 2008

(65) Prior Publication Data
US 2010/0011965 A1 Jan. 21, 2010

(30) Foreign Application Priority Data
Dec. 12, 2006 (IT) .................. FI2006A0319

(51) Int. Cl.
*A47J 31/06* (2006.01)
(52) U.S. Cl.
USPC ............................. 99/295; 99/269 R; 99/323
(58) Field of Classification Search
USPC ......................... 99/289 R, 295, 323

IPC .......................................................... A47J 31/06
See application file for complete search history.

(56) References Cited

U.S. PATENT DOCUMENTS

| | | | | |
|---|---|---|---|---|
| 3,470,812 A | * | 10/1969 | Levinson | 99/295 |
| 4,497,243 A | * | 2/1985 | Cavalli | 99/323 |
| 5,794,519 A | * | 8/1998 | Fischer | 99/295 |
| 6,026,732 A | * | 2/2000 | Kollep et al. | 99/295 |
| 6,490,966 B2 | * | 12/2002 | Mariller et al. | 99/289 R |
| 6,857,353 B2 | | 2/2005 | Kollep et al. | |
| 7,231,869 B2 | * | 6/2007 | Halliday et al. | 99/289 R |
| 2001/0052294 A1 | | 12/2001 | Schmed | |
| 2002/0002913 A1 | | 1/2002 | Mariller et al. | |
| 2002/0124736 A1 | * | 9/2002 | Kollep et al. | 99/289 R |
| 2003/0056655 A1 | | 3/2003 | Kollep et al. | |
| 2006/0123998 A1 | * | 6/2006 | Castellani | 99/495 |
| 2010/0011965 A1 | * | 1/2010 | Turi | 99/289 R |

FOREIGN PATENT DOCUMENTS

| | | | | |
|---|---|---|---|---|
| EP | 1 669 011 | | 6/2006 | |
| WO | WO2007045553 | * | 4/2007 | A47J 31/06 |

* cited by examiner

*Primary Examiner* — Gene Kim
*Assistant Examiner* — Matthew B Stanczak

(57) ABSTRACT

A dispensing head includes an infusion chamber constituted by at least one first portion in which a seat for single-dose capsules is set, and one second, closing, portion of the infusion chamber. The dispensing head also includes an oscillating expeller set between the first and second portions of the infusion chamber. The oscillating expeller engages a capsule inserted in the infusion chamber to cause expulsion thereof when the infusion chamber is opened. The expeller includes an appendage shaped so as to engage the capsule from the bottom and lift it from the infusion chamber.

18 Claims, 6 Drawing Sheets

DISPENSING HEAD FOR A MACHINE FOR MAKING BEVERAGES WITH SINGLE-DOSE CAPSULES, AND MACHINE COMPRISING SAID DISPENSING HEAD

TECHNICAL FIELD

The present invention relates to improvements to machines for making espresso coffee or other beverages or foodstuffs starting from capsules, typically single-dose capsules. More in particular, the present invention relates to improvements to the dispensing head of a machine of this type.

STATE OF THE ART

For making beverages via extraction with water from single-dose capsules, various machines are known which comprise an infusion chamber provided with two portions that are mobile with respect to one another, in which typically one of the two forms the seat for housing the single-dose capsules whilst the other provides for closing of the infusion chamber. The conformation of the dispensing head of the infusion chamber depends upon the type and conformation of the single-dose capsules containing the substance with which the beverage is to be made. Opening and closing of the infusion chamber can be obtained with mechanisms of various types, also according to how automatic the machine in which the infusion head is inserted actually is. Usually extractor or expeller members are also provided for expelling or discharging the exhausted capsule after dispensing the beverage.

Examples of dispensing heads with an oscillatory movement of opening and closing of the infusion chamber are described in US-A-2002/0002913 and US-A-2003/0056655. Described in U.S. Pat. No. 6,857,353 is an infusion system with an oscillating expeller or extractor for discharging the exhausted capsules. The oscillation of the expeller is controlled by the movement of opening of the infusion chamber.

EP-A-1669011 discloses an infusion head for making espresso coffee starting from single-dose capsules according to the preamble of claim 1. Said dispensing head comprises an infusion chamber shaped with a first portion in which the seat for receiving the single-dose capsule or cartridge is provided and a second, closing, portion of the infusion chamber. The two portions are mobile with an opening and closing oscillation movement. Set between the two portions is an oscillating expeller that engages the capsule inserted in the infusion chamber to bring about expulsion thereof when the infusion chamber is opened. At the moment of opening of the infusion chamber, the expeller is temporarily constrained to the top mobile portion of the infusion chamber, so that, when the infusion chamber is opened via oscillation upwards of the top portion of the chamber itself, the expeller is drawn upwards and causes exit of the capsule from its seat into the bottom part of the infusion chamber, engaging it along a circular flange that surrounds the top surface of the capsule. The capsule slides then along guide surfaces of the oscillating expeller member and drops into an underlying collection area.

The above known dispensing head presents the drawback of enabling use only of capsules provided with a flange portion of adequate diameter, necessary to engage the capsule via the oscillating expeller.

OBJECTS AND SUMMARY OF THE INVENTION

An object of one embodiment of the present invention is to provide a dispensing head of the type described above that can use also capsules with other shapes.

Substantially, according to the invention, for using capsules that do not have a flanged edge, or else that have an edge with a flange of radial dimensions that are too small to be engaged by an oscillating expeller of the type described for example in EP-A-1669011, according to the invention it is envisaged that the expeller be provided with an appendage shaped so as to engage the single-dose capsule from the bottom of the capsule itself. The appendage sets itself adjacent to the bottom of the seat made in the first portion of the infusion chamber when the capsule is inserted in the chamber, and the latter is closed for proceeding to extraction of the beverage. When the infusion chamber is opened, the expeller oscillates upwards and draws along with it the exhausted capsule pushing it from the bottom by means of said appendage.

Further advantageous features and embodiments of the dispensing head according to the invention are indicated in the attached claims and will be described in greater detail in what follows with reference to a non-limiting example of embodiment of the invention.

BRIEF DESCRIPTION OF THE DRAWINGS

The invention will be more readily understood from the ensuing description and the attached drawings, which show a practical non-limiting embodiment of the invention. More in particular, in the drawings.

DETAILED DESCRIPTION OF AN EMBODIMENT OF THE INVENTION

In what follows, the invention will be described with particular reference to an application thereof to a machine for making espresso coffee, but it is to be understood that the principles underlying the invention can be used also in other types of machines in which similar problems can arise. In general, the present invention can be applied to any machine designed for preparation of beverages or other foodstuffs starting from single-dose capsules that are to be inserted in an infusion chamber and subsequently extracted therefrom and discharged.

Figure 7:
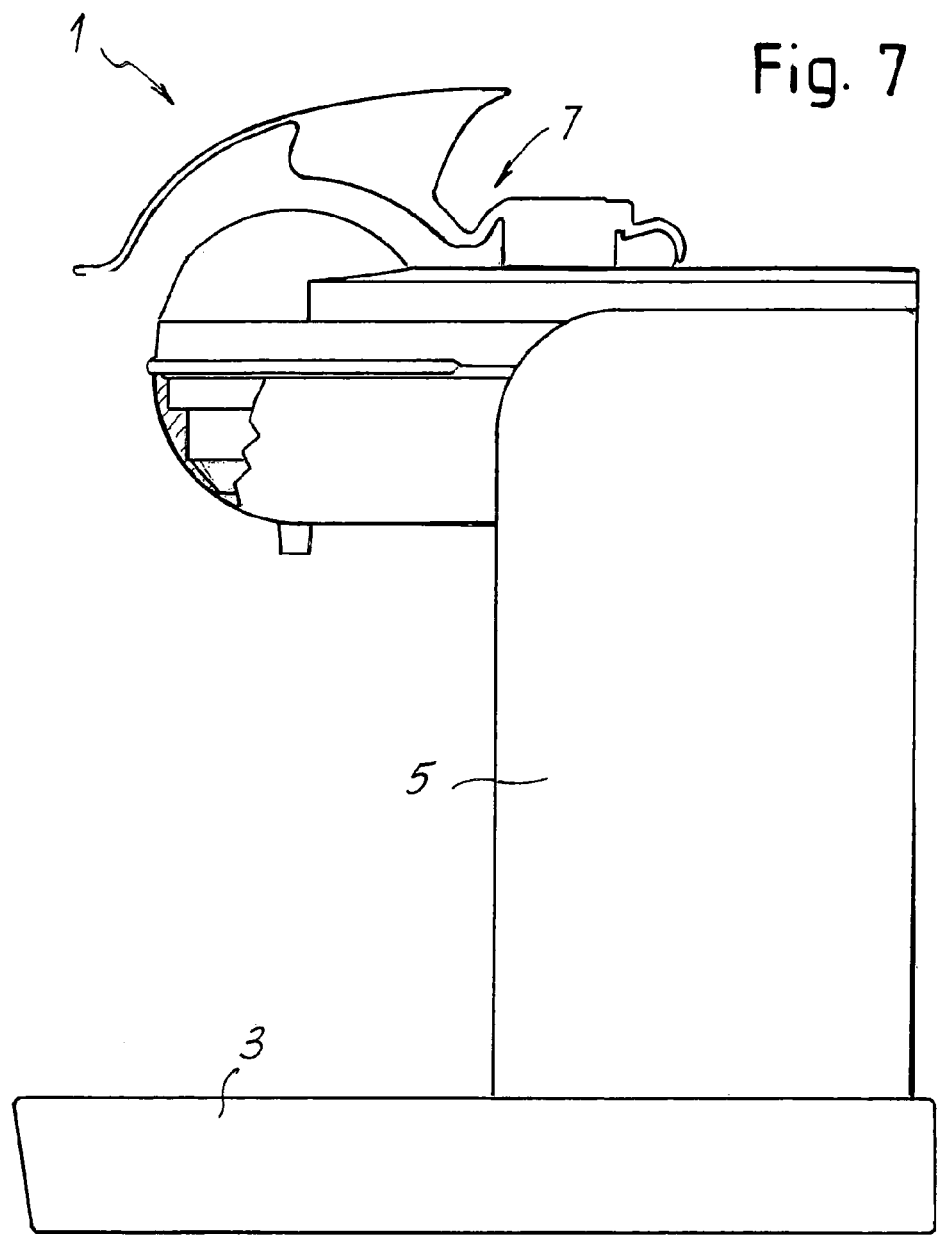
FIG. 7 is a schematic view of a coffee machine or the like comprising a dispensing head according to the invention.

FIG. 7 shows very schematically a machine 1 for making espresso coffee comprising a base 3, an upright 5, and a dispensing head 7 configured according to the invention. The parts of the machine 1 not described in detail herein are in themselves known and not important for the purposes of the present invention.

The dispensing head 7, instead, and in particular the device for extracting the exhausted capsules, is described in detail in what follows with reference to FIGS. 1A to 6.

Figure 1A:
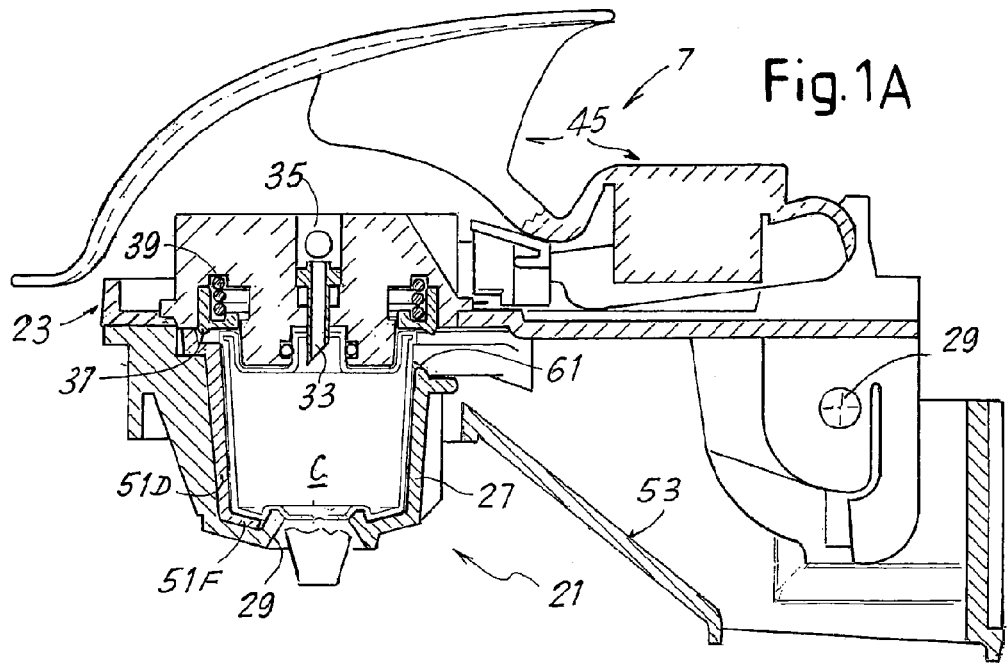
FIG. 1A is a schematic cross-sectional view of a dispensing head according to the invention in the closed configuration.
Figure 1B:
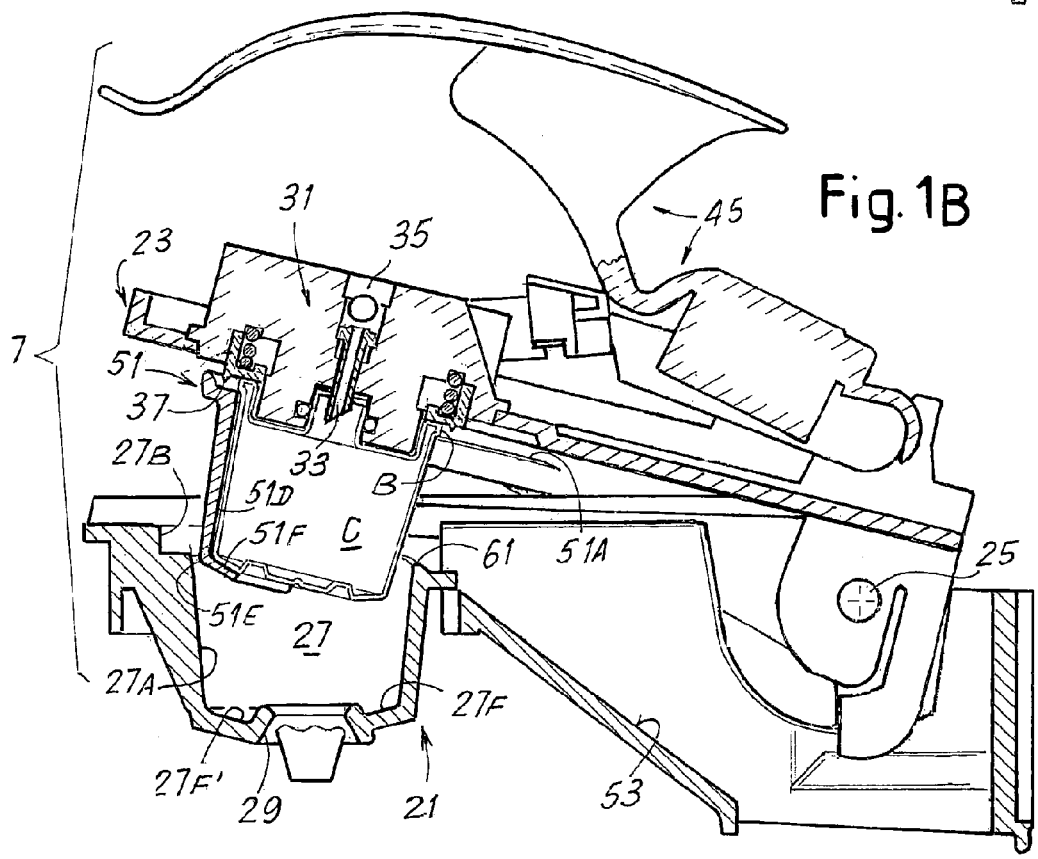
FIG. 1B shows the dispensing head of FIG. 1A in the step of opening.
Figure 1C:
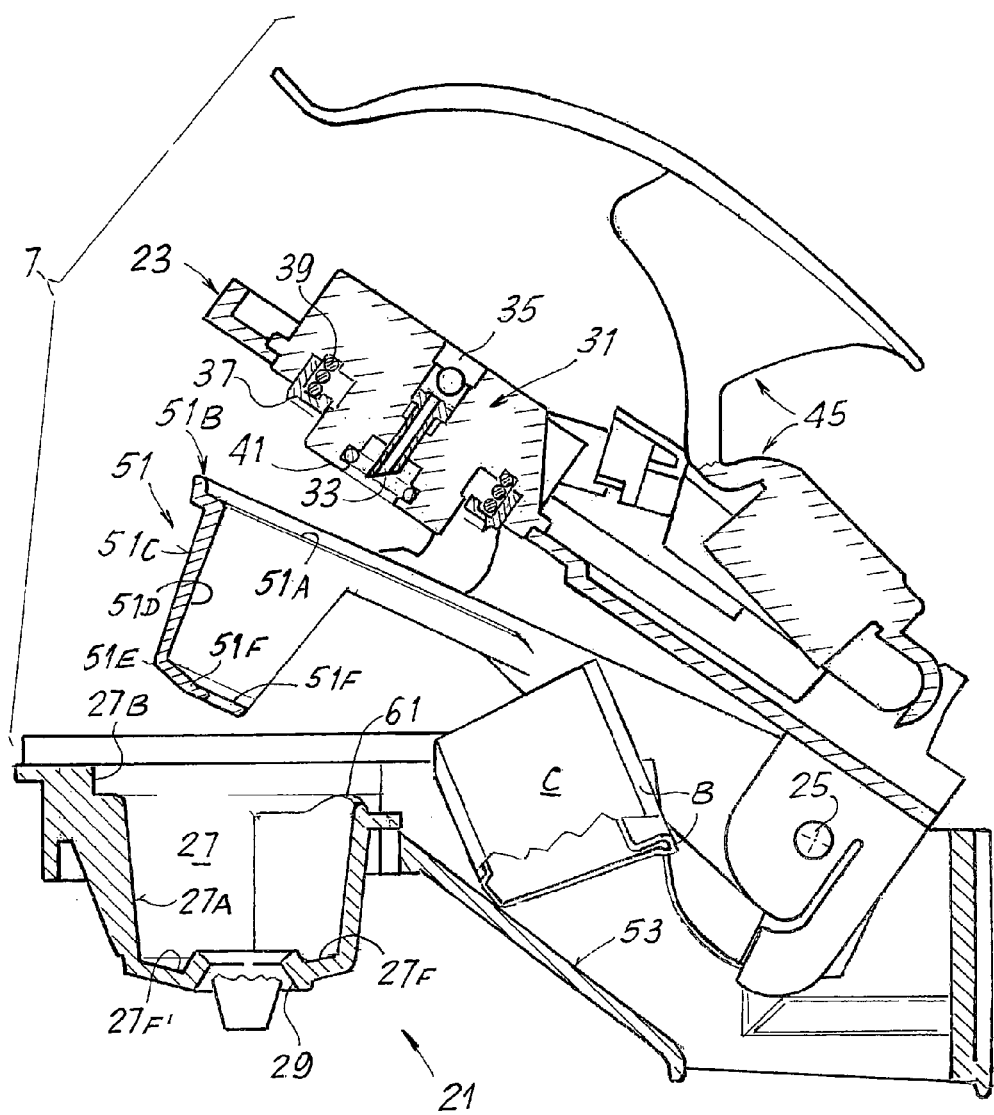
FIG. 1C shows the head of FIGS. 1A and 1B in a step of discharging the exhausted capsule, with the infusion chamber almost completely open.
Figure 2:
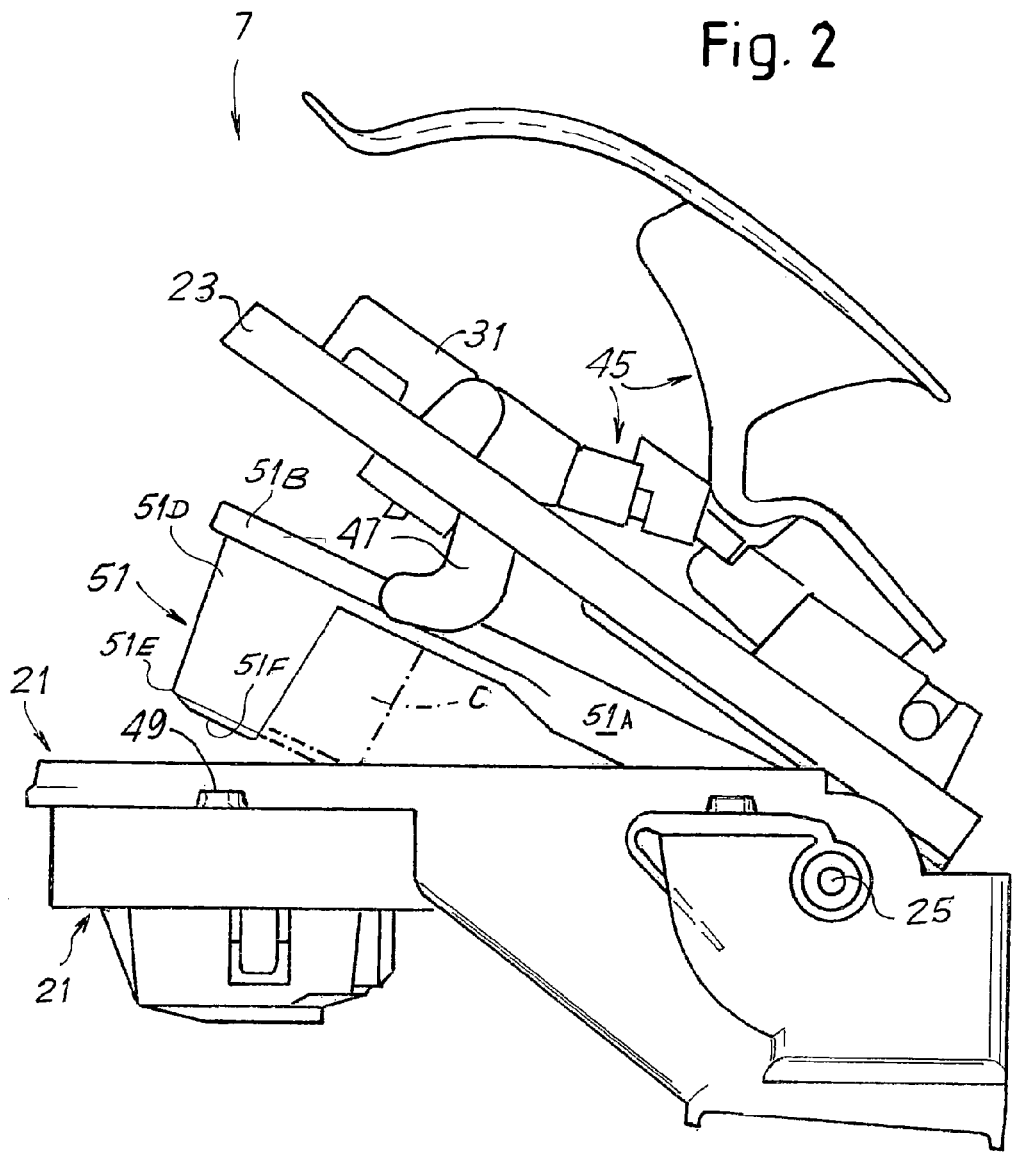
FIG. 2 is a side view of the infusion chamber in a position almost completely open.

In particular, with reference to FIGS. 1A, 1B, 1C and 2, in a particularly advantageous embodiment of the invention, the dispensing head 7 comprises a first portion 21 fixed with respect to the upright 5 and a second portion 23 articulated in 25 to the portion 21 about a substantially horizontal axis. The portion 23 can assume a closed configuration (FIG. 1A) and an open configuration (FIG. 2).

The two portions 21, 23 define an infusion chamber. In the bottom portion 21 is provided a seat 27 for single-dose capsules C used for making the beverage, for example coffee. The seat 27 has a conformation substantially having the shape of a truncated cone with a bottom and side walls appropriately shaped for receiving an expeller of the exhausted capsules C, as will be described in greater detail here below. In the bottom of the seat 27 a perforator (not shown) can be arranged, received in a housing 29 surrounded by an annular projection that projects from the bottom of the seat 27, for perforating the bottom of the capsule C. In a way in itself known, the perforator is provided with a channel for outlet of the beverage. Not excluded is the possibility of using capsules with an open bottom, which do not require a perforator, or else capsules with a point of pre-failure that can be opened as a result of the pressure of the water that is introduced within them via a top perforator or in some other suitable way.

The top oscillating portion 23 of the infusion chamber carries an assembly 31 for perforation and for dispensing water, e.g. hot water under pressure, within the capsule C when the latter is housed in the seat 27 and the infusion chamber defined by the portions 21 and 23 is closed. With particular reference to FIGS. 1A, 1B, 1C, the perforation and dispensing assembly 31 comprises a permeable perforator 33 in communication with a duct 35, connected to which is a pipe (not shown) for supplying water under pressure. Set around the perforator 33 is a slider 37, upon which a pressure is exerted elastically by a compression spring 39 to press against the top edge B of a capsule C that is located in the infusion chamber (FIG. 1A).

In some embodiments of the invention, developing around the tip of the hollow perforator 33 is a cylindrical element 41, which surrounds a projecting area or shank S made in the closing top of the capsule C, said shank being perforated by the perforator 33 when the infusion chamber is closed by oscillating the oscillating portion 23 downwards towards the fixed portion 21. It must be understood that the design of the perforator 33 and of the area that surrounds it can vary to adapt to the shape of the top surface of the single-dose capsule C to which the particular dispensing head 7 is to be applied.

In some embodiments, the head has a mechanism for closing the infusion chamber, designated as a whole by 45. The closing device 45 can be the same as or equivalent to what is described in EP-A-1669011, which is integrally incorporated in the present description by reference and to which reference can be made for further constructional details. It is advantageous here to note that the closing device 45 has teeth 47 which engage in retention elements 49 that are fixed with respect to the fixed portion 21 of the infusion chamber.

Set between the fixed part 21 and the mobile part 23, which are hinged to one another about the axis 25, is an expeller 51 for extracting the exhausted capsules C from the seat 27 of the infusion chamber and for discharging them downwards along a chute 53. According to an advantageous embodiment, the chute 53 is made of a single piece with the portion 21.

Figure 3:
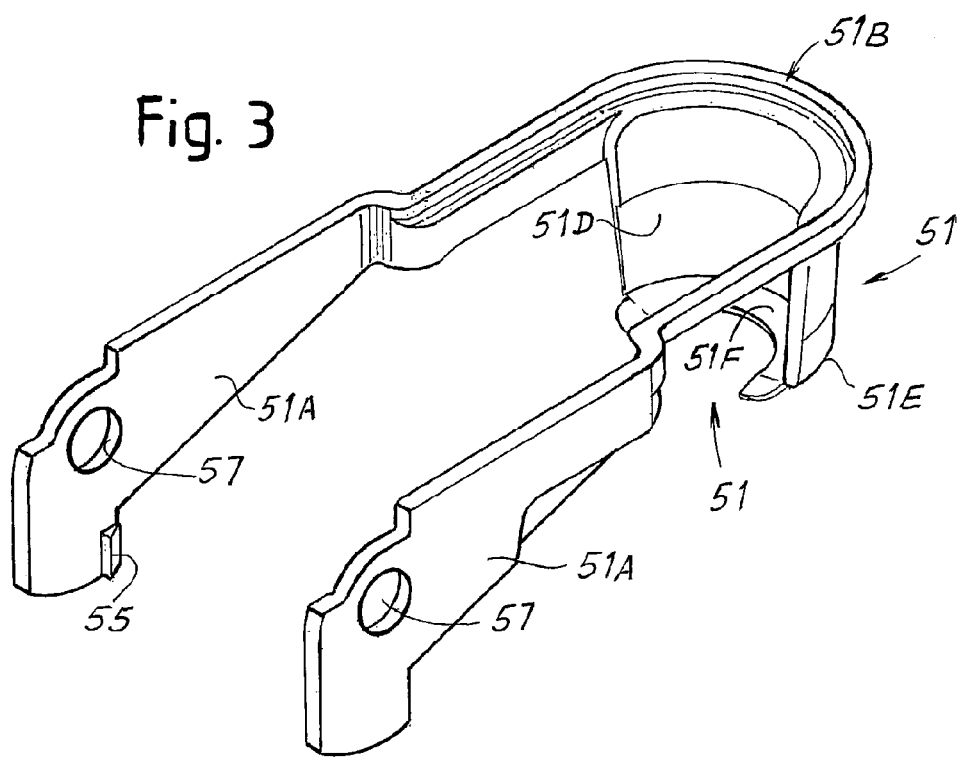
FIG. 3 is an axonometric view of the expeller separated from the remaining parts of the dispensing head.
Figure 4:
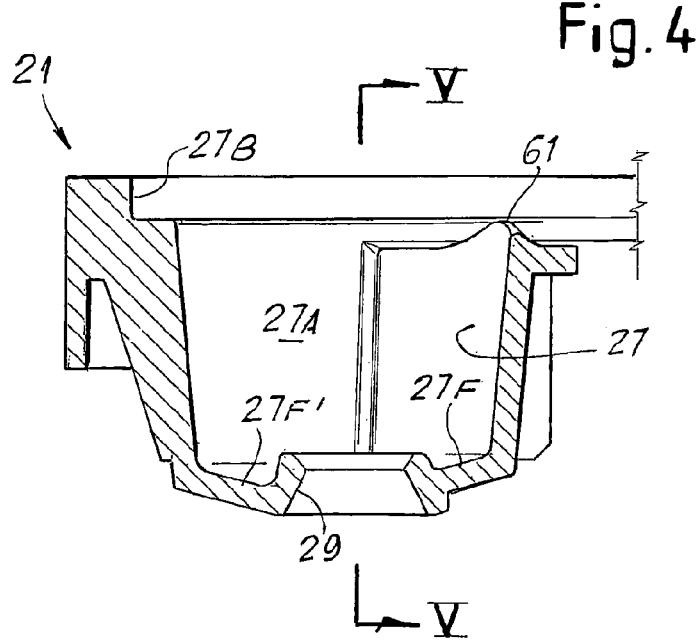
FIG. 4 is an enlarged cross-sectional view of the seat of the capsule made in the bottom portion of the infusion chamber.

The expeller 51 is shown in isolation in axonometric view in FIG. 3. According to a preferred embodiment, said expeller 51 is articulated about the same axis 25 about which the mobile portion 23 of the dispensing head 7 oscillates. Designated by 55 are teeth, arranged in the proximity of through holes 57 for engagement to the oscillation pivot, with which the expeller 51 temporarily engages appendages 59, which are fixed with respect to the oscillating portion 23 of the infusion chamber, so that raising of the portion 23 with oscillatory movement about the axis 25 entails an oscillation upwards also of the expeller 51. The configuration of the appendages 59 and of the teeth 55 is such that, once a certain inclination that guarantees discharge by gravity of the capsules C is reached, the expeller 51 is released from the appendages 59 and drops back into its bottom position to rest upon the fixed portion 21 of the infusion chamber 21, 23. This mechanism of temporary engagement of the expeller 51 to the top oscillating mobile portion 23 of the infusion chamber is in itself known and described in EP-A-1669011.

As may be noted in particular in FIG. 3, according to an advantageous embodiment, the expeller 51 has a fork-like or U-shaped conformation terminating with the two arms 51A, in which the holes 57 with which the expeller 51 engages the axis of oscillation 25 are made. According to an advantageous embodiment, the expeller 51 has an arched portion 51B, which joins the arms 51A and forms with these a single body.

According to a preferred embodiment of the invention, fixed with respect to the arched portion 51B of the expeller 51 is a member for engagement of the capsules, designated by 51C and developing downwards and shaped so as to engage underneath the capsule C that is inserted in the seat 27 of the infusion head.

According to an advantageous embodiment, the engagement member 51C has a shape with a wall having a portion shaped like a truncated cone 51D, the internal surface of which substantially coincides as regards its shape and dimensions with the external side surface of the capsules Q designed for the specific dispensing head 7. According to an advantageous embodiment, extending from the bottom semicircular edge 51E of the wall having the shape of a truncated cone 51D is an appendage 51F having a development like the sector of an annulus, the external diameter of which is approximately equal to the diameter of the bottom base of the capsule C.

According to an advantageous embodiment, the appendage 51F shaped like the sector of an annulus has a development of approximately 180° and leaves at the centre an ample free semicircular area having the purposes clarified hereinafter.

Basically, then, the engagement member 51C formed by the portions 51D and 51F has a shape that copies the external surface of a part of the capsule C for embracing the latter laterally and from beneath for the purpose of extracting it from the infusion chamber, and more particularly from the seat 27 of the latter, at the end of the infusion process in order to discharge the exhausted capsule and enable insertion in the seat 27 of a new capsule.

According to an advantageous embodiment of the invention, in order to prevent the appendage 51F shaped like the sector of an annulus and the partial wall having the shape of a truncated cone 51D fixed with respect thereto from interfering with the seat 27 and/or with the capsule C, the internal surface of the seat 27 has a retracted side area 27A, inserted within which is the wall having the shape of a truncated cone 51D of the expeller 51 when the latter is in the closing position (FIG. 1A). Also the bottom of the seat 27 of the infusion chamber has a conformation suitable for preventing any interference between the appendage 51F shaped like the sector of an annulus and the capsule C and/or the bottom of the seat 27. As may be noted in particular in FIGS. 4 and 5, the bottom designated by 27F of the seat 27 has a lowered portion 27F' of shape and dimensions such as to receive the appendage 51F shaped like the sector of an annulus of the expeller 51. It may be noted in particular in FIG. 1A that, when the infusion chamber is closed with the capsule C within the seat 27, the wall 51D and the appendage 51F shaped like the sector of an annulus of the expeller 51 are housed in the additional space made in the portion 27A and in the lowered area 27F', respectively of the conical side wall and of the bottom of the seat 27.

The edge of the seat 27 is shaped in 27B (see in particular FIGS. 4 and 6) in such a way as to receive the curved portion 51B of radiusing between the arms 51A of the oscillating expeller 51. In this way, when the infusion chamber is in the closing position, the top surface of the expeller 51 does not interfere with the action of the elastic slider 37 that grips on the edge B of the capsule C.

Figure 5:
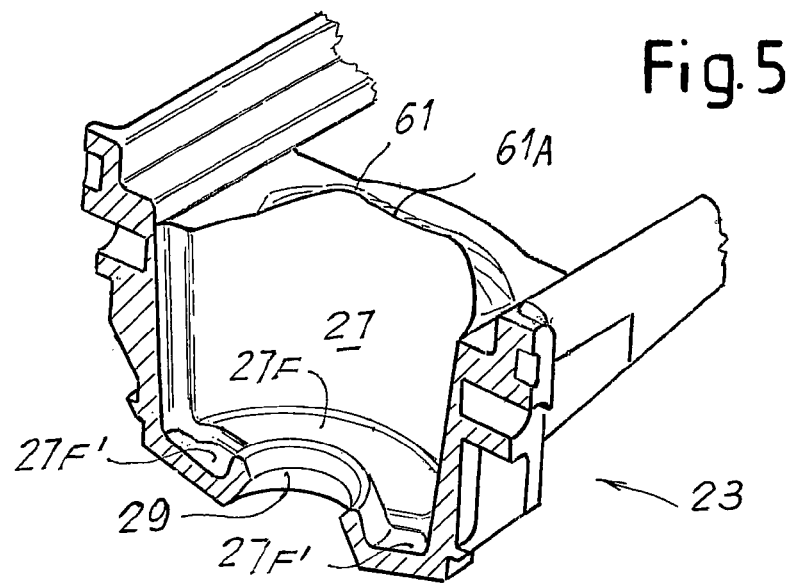
FIG. 5 is an axonometric view of a part of the bottom portion of the infusion chamber and corresponding seat for receiving the capsule.
Figure 6:
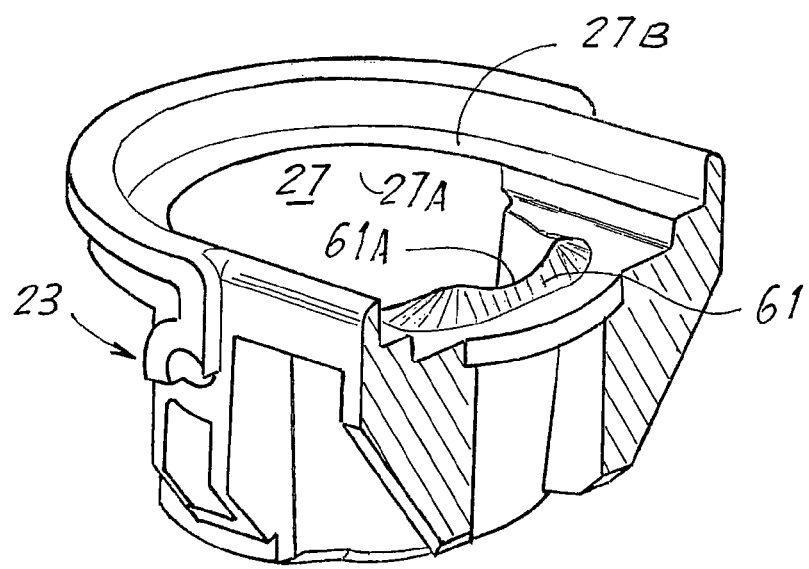
FIG. 6 is an external axonometric view of the bottom portion of the infusion chamber.

According to an advantageous embodiment of the invention, to facilitate expulsion and discharge of the exhausted capsule C along the inlet of the seat 27 of the infusion chamber, a shaped projection 61 is provided (see in particular FIGS. 6 and 5). According to an advantageous embodiment, the projection 61 has in its central area a concave profile 61A for interference with the lateral conical surface of the exhausted capsule C, when the latter is slid out of the seat 27 by means of the oscillating expeller 51.

Basically, as may be understood, for example, from FIG. 1B, during its movement of oscillation about the axis 25, the oscillating expeller 51 raises the capsule C, supporting it from beneath and extracting it from the seat 27. The capsule tends to slide along the expeller and comes into contact with the edge 61. Consequently, the capsule C, by interfering with the edge 61, is subject to a pushing action which causes it to turn upside down and to fall into the empty space between the two arms 51A of the expeller 51 and then onto the chute 53, which discharges the capsules into an underlying container (not shown).

It is understood that the drawings merely show a possible example of embodiment of the invention, which can undergo variations in the forms and arrangements, without thereby departing from the scope of the idea underlying the invention. The possible presence of reference numbers in the annexed claims has the purpose of facilitating reading of the claims with reference to the description and the drawings, and in no way limits the scope of protection represented by the claims.

The invention claimed is:

1. A dispensing head for a machine for making beverages by infusing water into a top of a capsule containing at least one substance to obtain beverages from a bottom of the capsule, the dispensing head comprising:
a first portion having a seat including an axis and a floor for receiving the bottom of the capsule;
a second portion connected to said first portion at the axis for being mobile with respect to the first portion and for closing and opening said seat; and
an expeller for entering and exiting the seat and engaging the bottom of the capsule to cause expulsion of the capsule when said second portion is moved and the seat is opened, said expeller
including an appendage shaped to engage the bottom of the capsule
and a wall for extending said appendage to said floor,
wherein said appendage has a shape approximating a sector of an annulus.

2. The dispensing head according to claim 1, wherein said expeller has a U-shaped conformation and comprises:
a first articulation and a second articulation arm or pivoting about said axis;
an intermediate arched portion for joining said first and second arms; and
a curved wall having a concave surface of contact with said capsule and extending from said expeller towards said floor, wherein said curved wall is connected to said arched portion.

3. The dispensing head according to claim 2, wherein said wall is curved and has a substantially conical shape.

4. The dispensing head according to claim 1, wherein said first and second portions are provided with a reciprocating movement of oscillation, and wherein the dispensing head further comprises a member of temporary constraint positioned between said expeller and said second portion and configured to be temporarily connected to the second portion during the movement of opening of the seat and to cause oscillation of the expeller with respect to the first portion.

5. The dispensing head according to claim 1, wherein said seat includes a lowered portion and said appendage is housed in the lowered portion when the seat is closed.

6. The dispensing head according to claim 5, wherein the bottom of said seat has an annular projection and said lowered portion is formed on the outside of said annular projection.

7. The dispensing head according to claim 1, wherein said seat includes a side wall with a retracted area and said wall is housed in the retracted area.

8. The dispensing head according to claim 1, wherein the seat includes a top edge, and wherein the dispensing head further comprises a projection near said top edge closer to the axis for overturning of the capsule.

9. The dispensing head according to claim 8, further comprising a chute underneath said projection for discharging the capsule.

10. The dispensing head according to claim 1, wherein said wall is curved and has a substantially conical shape.

11. The dispensing head of claim 1, wherein the bottom of the seat has an edge portion which is lower than a center part of the bottom of the seat, and wherein the edge portion of the seat is shaped to receive the appendage.

12. The dispensing head of claim 1, wherein the expeller is connected at the axis between said first portion and said second portion.

13. A machine for making a beverage from single-dose capsules containing at least one substance by introducing water into a top of the capsule and obtaining the beverage from a bottom of the capsule, the machine comprising:
a dispensing head
including a first portion having an axis and a seat including a floor for receiving the bottom of the capsule, a second portion connected to said first portion at the axis for being mobile with respect to the first portion and for closing and opening said
seat, and an expeller for exiting the seat and engaging the bottom of the capsule to cause expulsion of the capsule when said second portion is moved and the seat is opened, said expeller
including an appendage shaped to engage the bottom of the capsule
and a wall for extending said appendage to said floor; and
at least one articulation arm for pivoting about the axis,
wherein said appendage has a shape approximating a sector of an annulus.

14. The machine according to claim 13, wherein said first and second portions are provided with a reciprocating movement of oscillation, and wherein the dispensing head further comprises a member of temporary constraint portioned between said expeller and said second portion and configured to be temporarily connected to the second portion during the movement of opening of the seat and to cause oscillation of the expeller with respect to the first portion.

15. The machine according to claim 13, wherein said wall is curved and has a substantially conical shape.

16. The machine of claim 13, wherein the bottom of the seat has an edge portion which is lower than a center part of the bottom of the seat, and wherein the edge portion of the seat is shaped to receive the appendage.

17. The machine of claim 13, wherein the expeller connected at the axis between said first portion and said second portion.

18. The machine of claim 13, wherein the at least one articulation arm includes a first articulation arm and a second articulation arm for pivoting about the axis; and wherein the machine further comprises an intermediate arched portion for joining the fast and second arms to one another.

* * * * *